(12) United States Patent
Anderson

(10) Patent No.: US 6,279,731 B1
(45) Date of Patent: Aug. 28, 2001

(54) VIBRATORY CONVEYOR TABLE

(76) Inventor: Ronald L. Anderson, 410 Chambers, Eugene, OR (US) 97402

( * ) Notice: Subject to any disclaimer, the term of this patent is extended or adjusted under 35 U.S.C. 154(b) by 0 days.

(21) Appl. No.: 09/427,060

(22) Filed: Oct. 26, 1999

(51) Int. Cl.$^7$ .................................................. B65G 27/08
(52) U.S. Cl. .............................................. 198/763; 198/766
(58) Field of Search ................................... 198/763, 766, 198/770, 771

(56) References Cited

U.S. PATENT DOCUMENTS

| | | | | |
|---|---|---|---|---|
| 2,935,177 | * | 5/1960 | Morris | 198/763 |
| 3,165,197 | | 1/1965 | Allen et al. | 198/220 |
| 3,348,664 | * | 10/1967 | Renner | 198/763 |
| 3,362,524 | | 1/1968 | Holman | 198/220 |
| 3,542,186 | | 11/1970 | Allen | 198/220 |
| 3,605,996 | | 9/1971 | Holman | 198/220 |
| 3,901,380 | | 8/1975 | Zier et al. | 198/220 |
| 4,162,778 | * | 7/1979 | Kraft | 198/763 |
| 4,313,535 | * | 2/1982 | Carmichael | 198/763 |
| 4,449,626 | * | 5/1984 | Dodd | 198/763 |
| 4,813,532 | * | 3/1989 | Harper | 198/763 |
| 6,112,883 | * | 9/2000 | Krause et al. | 198/763 |

* cited by examiner

*Primary Examiner*—Douglas Hess
(74) *Attorney, Agent, or Firm*—James D. Givnan, Jr.

(57) ABSTRACT

A conveyor tray is yieldably mounted on a table base and during table operation conveys articles therealong by vibratory motion. A base supports an electric motor for driving a power output shaft journalled on the base. Eccentrics mounted on the power output shaft impart orbital motion to bearing housings each mounted on a flexible connector plate. The upper ends of the connector plates are coupled to the table tray and impart arcuate motion to the tray. The connector plates are of fiberglass reinforced material with each plate supporting a bearing housing with an eccentric. Plates in place on each connector plate are detachably mounted to vary vibratory tray travel.

11 Claims, 5 Drawing Sheets

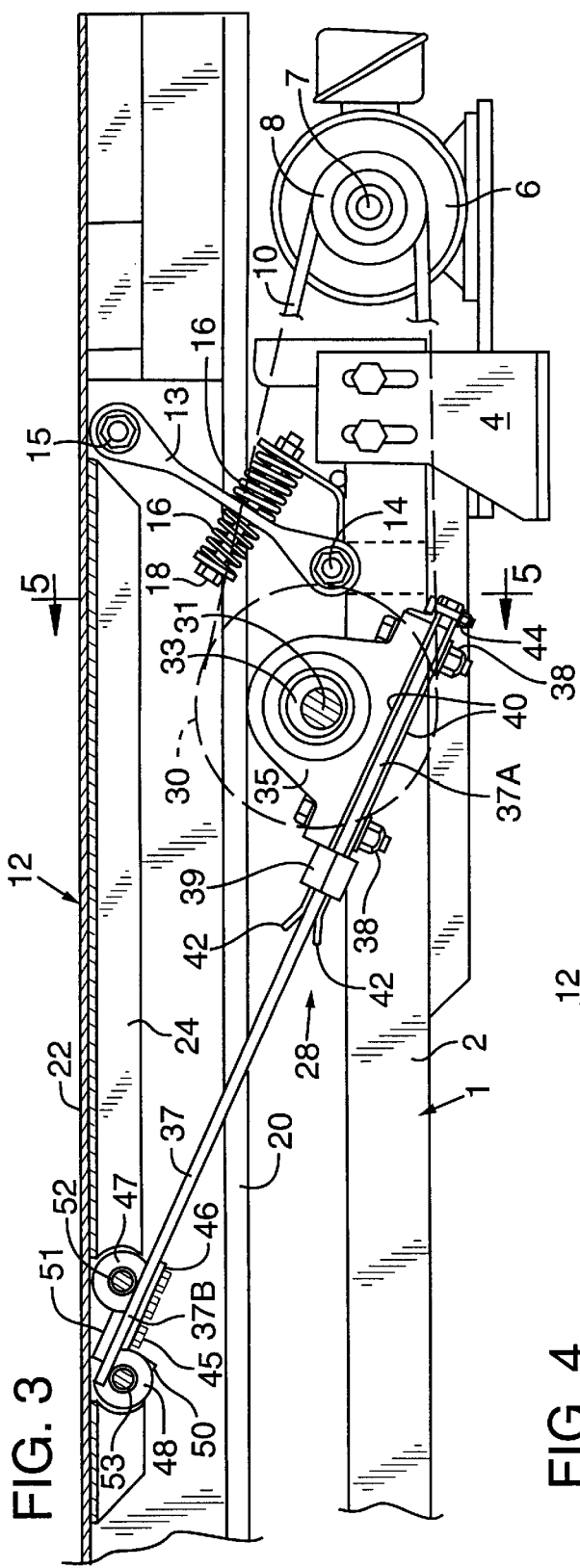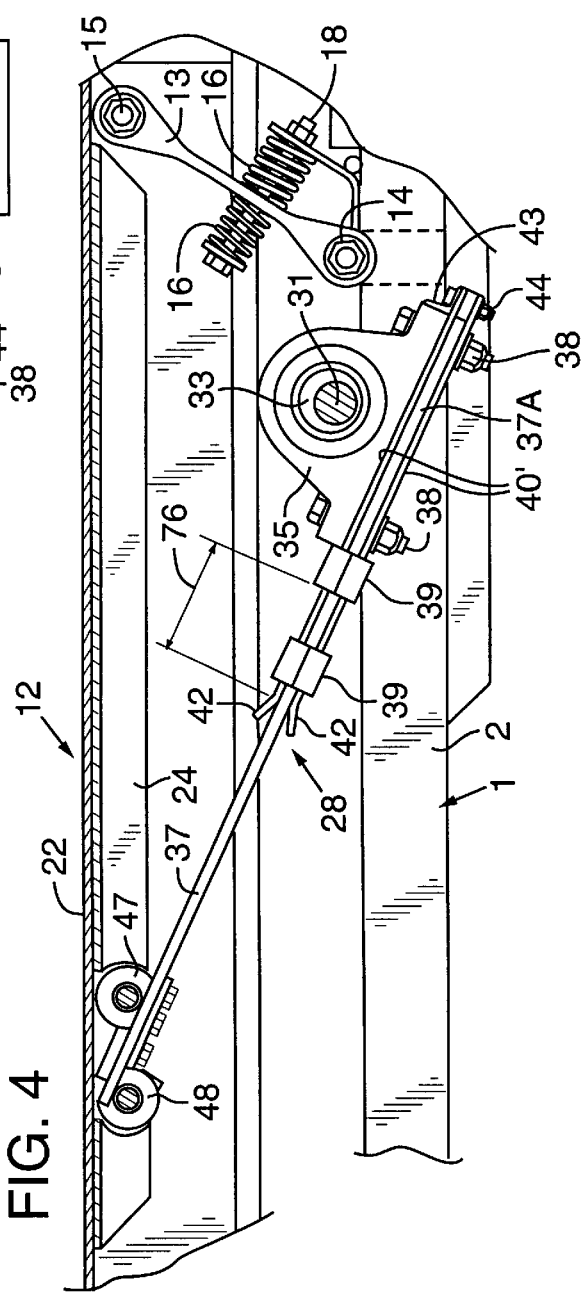

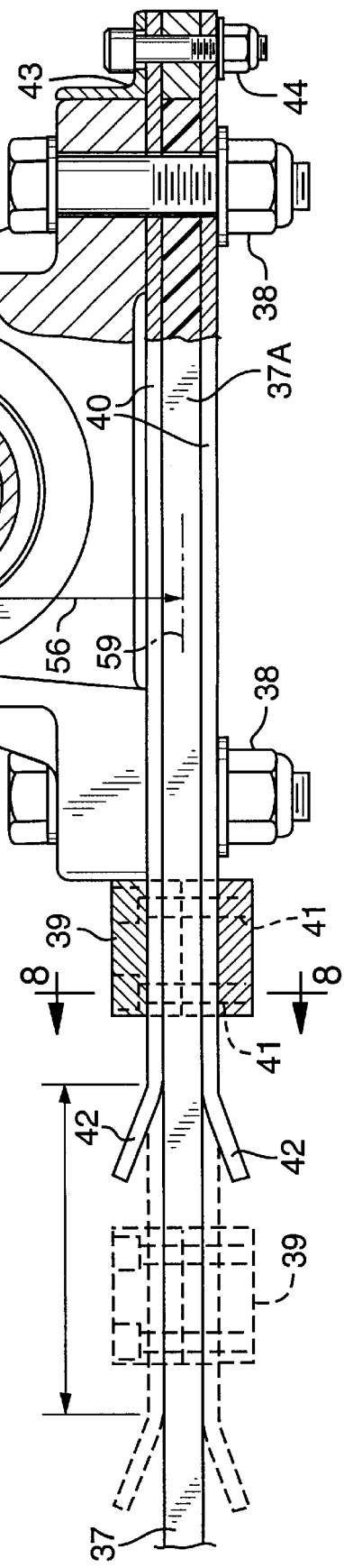
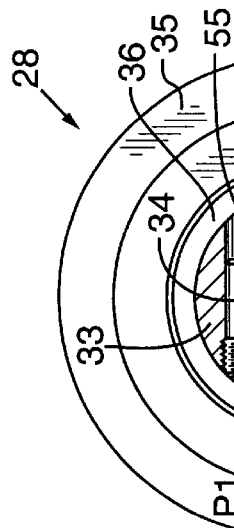
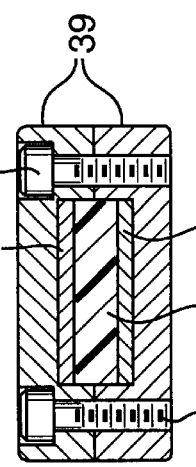
FIG. 7
FIG. 8

VIBRATORY CONVEYOR TABLE

BACKGROUND OF THE INVENTION

The present invention concerns vibratory conveyor tables.

Vibratory conveyor tables are used in various production operations for the conveyance of small particles including various food products. Characteristically, such tables include a base on which a power source is mounted for driving an actuator imparting motion to connector means coupled to a tray supporting the articles to be conveyed. Such trays are movably mounted on struts carried by the base to permit vibratory movement of the tray and advancement of articles thereon in a unidirectional intermittent manner.

Commonly vibratory tables are designed to convey specific articles with the vibratory tray travel calculated for optimum conveyance of the articles. Accordingly, a vibratory table intended for use in a particular conveying operation is not readily altered for use in a different conveying operation, for example, with articles of different size and/or weight. To modify throw or travel imparted to a vibratory tray entails considerable effort in the disassembly of drive components and substitution of different components. Additionally, the modification of a vibratory conveyor table can require taking of the table out of a production line for a substantial period of time, which is highly undesirable during the processing of food products as such equipment frequently operates on a 24 hour a day basis during such times. The changing of bearings, shafts, etc., can entail costly machining to modify tray action or simply maintain such a table as such components are often designed to accomplish a specific use. An eccentric drive for tray activation may include connecting rods and eccentrics while other such tables are powered utilizing drive leaves of planar shape terminating in attachment to other leaves which support the table in a yieldable manner.

U.S. Pat. No. 3,165,197 discloses a vibratory conveyor table utilizing connecting rods to couple an eccentric drive with the table with each of the connecting rods connected to the table by flexible tabs or strips.

U.S. Pat. No. 3,362,524 discloses leaf members supporting a vibratory table on a base of the conveyor with the leaves made of "metal, or of impregnated multi-ply laminated fibrous material . . . ". Vibratory motion is imparted directly to the tables of the machine by eccentrics and rigid connectors.

U.S. Pat. No. 3,542,186 discloses a vibratory conveyor table having an eccentric drive powering rigid connecting rods each terminating at their distal ends in fiberglass "flexures" which depend from table segments. The "flexures" are of planar shape.

U.S. Pat. No. 3,901,380 shows a conveyor table supported by resilient struts.

SUMMARY OF THE PRESENT INVENTION

The present invention is embodied within a vibratory conveyor table and specifically the drive system for imparting vibratory movement to the conveyor table.

A base of the conveyor table supports a tray of the table in a yieldable manner by spring biased links or struts. Additionally, the base supports a power source driving an eccentric equipped shaft. The shaft carried eccentrics in bearing housings impart vibratory motion to the table tray through flexible connector plates. Each bearing housing is detachably mounted on a connector. Stiffeners in place on each connector plate and serve to reinforce a segment of the connector plate against flexure with stiffeners of different lengths being interchangeable to render desired segments of the connector plate inflexible to accomplish the desired throw or travel of the conveyor pan. Fastener elements retain the stiffeners in place on a connector plate and permit ready substitution of shorter or longer stiffeners to achieve desired tray action. Pillow block bearing housings may be utilized in the present tray drive system to render servicing or replacement of same in an economical, convenient manner as opposed to the use of custom made components.

Important objectives of the present invention include the provision of a drive system for the tray of a vibratory table including a connector plate of synthetic flexible material imparting vibratory motion directly to the conveyor table tray; the provision of a flexible connector plate coupling an eccentric bearing housing to the vibratory pan of a conveyor table with stiffener means being detachably mounted to the connector plate to permit varying the throw or travel of the tray; the provision of a laminated connector plate having stiffeners clamped thereto to vary the flexibility of the connector plate and accordingly the throw imparted to the vibratory tray.

BRIEF DESCRIPTION OF THE DRAWINGS

In the accompanying drawings:

FIG. 3 is a vertical section view of a fragment of the conveyor table showing the drive assembly;

FIG. 4 is a view similar to FIG. 3 but showing a modified form of the drive assembly;

FIG. 7 is an enlarged fragmentary view of an eccentric and housing therefor attached to a lower end segment of a connector plate; and FIG. 8 is a vertical sectional view taken along line 8—8 of FIG. 7.

DETAILED DESCRIPTION OF THE PREFERRED EMBODIMENTS

Figure 1:
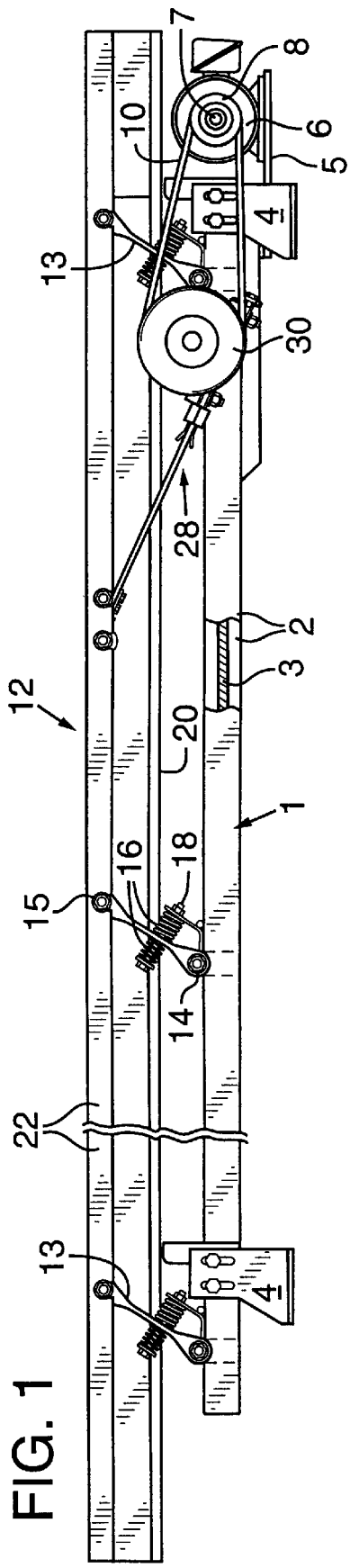
FIG. 1 is a side elevational view of a vibratory conveyor table utilizing the present invention.

With continuing attention to the drawings wherein applied reference numerals indicate parts similarly hereinafter identified, the reference numeral 1 indicates the base of the vibratory conveyor table which includes a base having a pair of tubular frame members 2 joined by an inverted channel 3. Feet as at 4 support the opposite ends of the base and are adjustably mounted on tubular frame members 2. At one end of the base is a support 5 for a motor 6. A motor drive shaft at 7 is equipped with a drive pulley 8 for a belt 10.

A conveyor tray is indicated generally at 12 upwardly spaced from the machine base by yieldable strut assemblies 13 supported in a pivotal manner by a base carried pivot 14. A tray mounted pivot is at 15. Each strut 13 is laterally confined in a biased manner by spiral springs 16 oppositely disposed from each strut and carried by a fastener 18. Accordingly tray 12 is spaced above base 1 by the strut assemblies which allow vibratory motion of the tray to transfer articles therealong by a following described drive. The conveyor tray further includes a pan 20 having sides.

Pan rails at 22 are reinforced by inverted channel members 23 interiorly of which extend tubular members 24.

Figure 5:
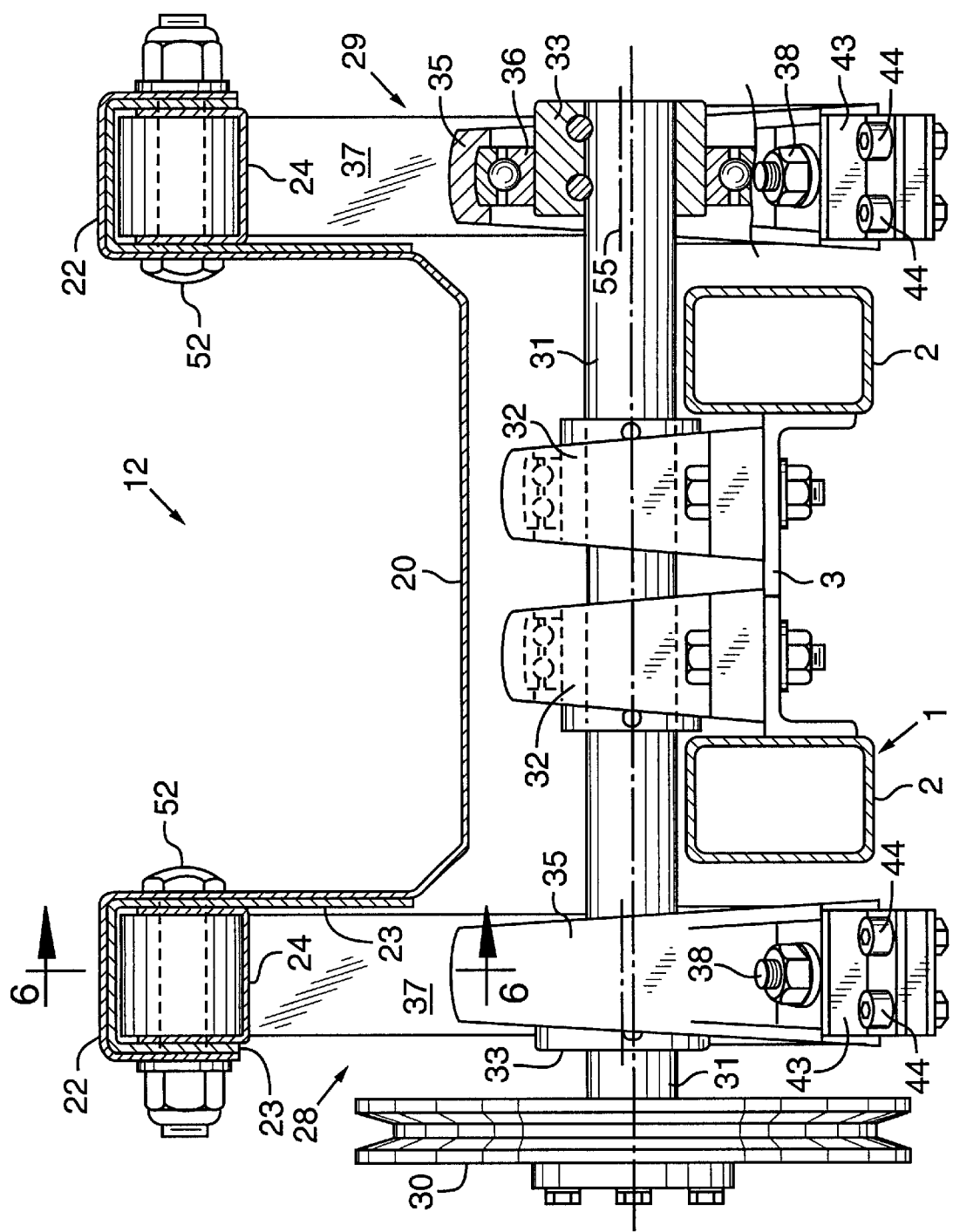
FIG. 5 is a vertical sectional view taken along line 5—5 of FIG. 3.

As shown in FIG. 5, pan rails at 22 are reinforced by inverted channel members 23 interiorly of which extend tubular members 24. Eccentries at 33, of drive assemblies generally at 28 and 29, are secured adjacent the end of shaft 31 by threaded tapered inserts as at 34. Each eccentric 33 is journalled in a bearing housing 35 having a bearing race 36 in place about the eccentric. Each housing 35 is mounted on an end segment 37A of a connector plate 37 of laminated fiberglass by fasteners 38 as shown in FIG. 7. A set of stiffener plates at 40 contributes to securement of the housings 35 and are further clamped to connector plate 37 by clamps at 39 and 43 fastened in a detachable manner by fasteners 41 and 44. Plate lips at 42 avoid damaging connector plate 37 of each drive assembly during plate flexure. Stiffener plates 40, may be of selected lengths to determine tray travel or throw for the articles being conveyed. Stiffener plate length is inversely proportional to the horizontal component of tray travel, e. g., the pair of stiffener plates 40' shown in FIG. 4 and of greater length at X would impart travel to tray 12 having a lesser horizontal component than the pair of stiffener plates 40 shown in FIG. 3. Connector plates 37 are of cross laminated, fiberglass reinforced material. One such product suitable for connector plate use is that sold under the name SCOTCHPLY, a registered trademark of the 3M Company.

Figure 6:
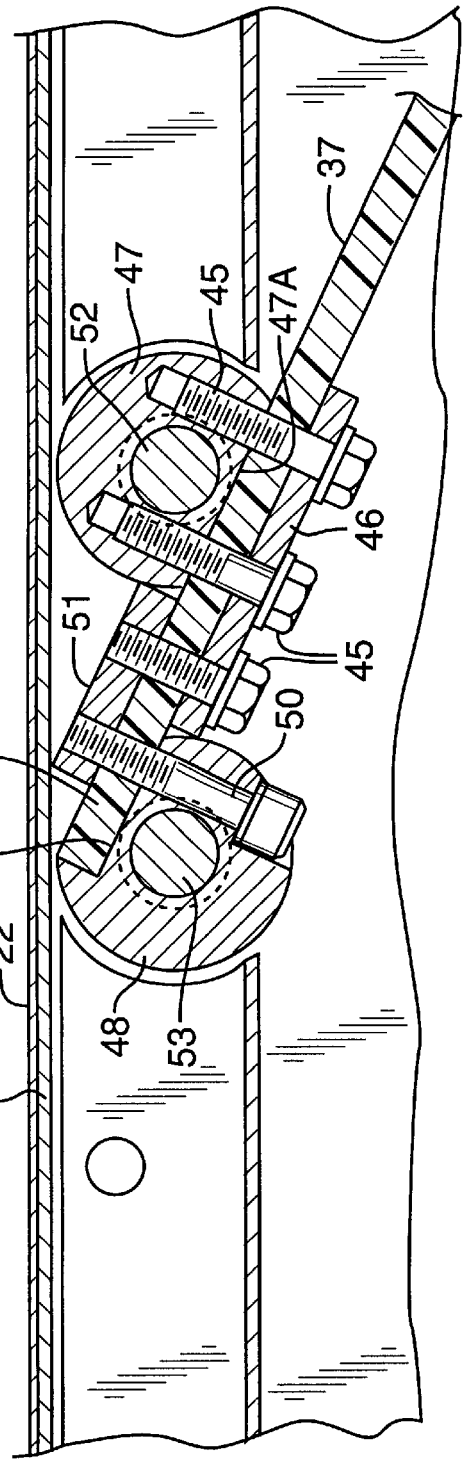
FIG. 6 is a fragmentary sectional view taken along line 6—6 of FIG. 5 of an upper end segment of a flexible connector plate secured to a rail of the table tray.
Figure 2:
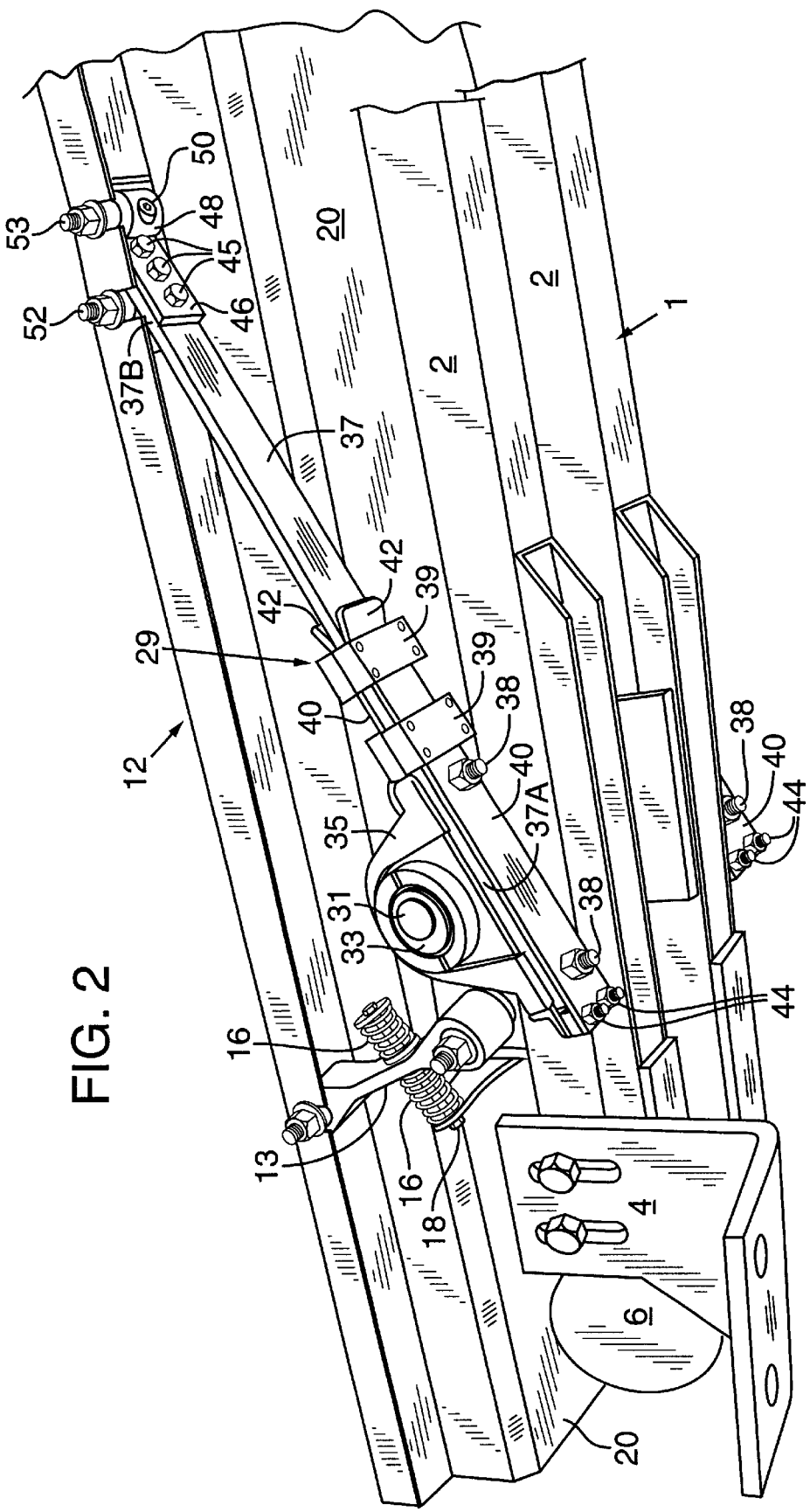
FIG. 2 is a fragmentary perspective view of the vibratory conveyor table showing the unseen side of FIG. 1.

An upper end segment 37B of each connector plate 37 is shown secured to a pan rail 22 by machine screws 45 which pass through a clamp 46, and the connector plate and seat within a block 47. A second block at 48, as well as block 47, have flats thereon against which upper end segment 37B of the connector plate abuts. Machine screws 50 (FIG. 6) draw a second clamp 51 against the connector plate. Blocks 47 and 48 are confined in inverted channel members 23 by bolt assemblies 52 and 53 fastened to the pan rails which are slotted to facilitate block and fastener installation.

In one satisfactory embodiment of the present invention the bearing housings 35 are shown as pillow block bearings as best shown in FIG. 7. The rotational axis at 55 of eccentric 33 is offset from the major axis 59 of connector plate 37. An arm is represented by intersecting line 56 with arm length directly proportional to flexure of connector plate 37 and hence the throw or travel of tray 12. Stated otherwise, such travel of tray 12 may be varied by altering the spacing of eccentric center 55 from the major axis 59 of connector plate 37 by the installation of a stiffener 40 of different thickness or the use of a shim (not shown) between bearing housing 35 and subjacent connector plate 37. During conveyor table operation, the eccentric 33 of each drive assembly imparts orbital motion to each bearing housing 35 which translates into orbital fore and aft travel of tray 12 as constrained by struts 13.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. In a conveyor having a base and a vibratory tray having a range of travel and yeildably mounted on the base and on which articles are conveyed, the improvement comprising,
a power source on the base,
an eccentric driven by said power source,
drive assemblies powered by said eccentric and each including a flexible connector plate having a first end segment attached to a tray, a bearing assembly including a housing about said eccentric said connector plate having a second end segment, mounting means for mounting said housing on the second end segment of the flexible connector plate and including fasteners permitting housing detachment from the connector plate, elongate stiffener means extending in a lengthwise direction along said connector plate to alter flexibility of the connector plate.

2. The improvement claimed in claim 1 wherein said bearing assembly is a pillow block bearing.

3. The improvement claimed in claim 1 wherein said stiffener means includes a plate interposed between said housing of the bearing assembly and the connector plate, said plate contributing to the distance between the rotational axis of said eccentric and the major axis of the connector plate and the degree of flexure of the connector plate and hence travel of the vibratory tray.

4. The improvement claimed in claim 3 wherein the length of said plate is directly proportional to the range of vibratory travel of the tray.

5. In a vibratory conveyor table having a base and a movably supported tray on which articles are conveyed, the improvement comprising,
a power source,
an eccentric driven by the power source and having a rotational axis, and
a drive assembly including a connector plate of elongate shape and of flexible synthetic material having a first end coupled to the tray, a housing in place on said eccentric and carried by a second end of the connector plate, said eccentric at all times vetically offset from said second end of the connector plate and imparting flexure and linear loads to the connector plate.

6. The improvement claimed in claim 5 wherein said drive assembly includes stiffener means for inhibiting flexure of the connector plate.

7. The improvement claimed in claim 6 wherein said stiffener means are embodied in plates oppositely disposed long said end segment of the connector plate.

8. The improvement claimed in claim 7 wherein said drive assembly includes clamps removably clamping said plates to the connector plate to allow substitution of plates of greater or lesser length to vary flexure of the connector plate to alter the range of tray travel.

9. The improvement claimed in claim 5 wherein said drive assembly includes fasteners removably coupling said housing to said connector plate.

10. A drive assembly for a conveyor having a base and a vibratory tray,
a power source on said base,
a drive assembly imparting vibratory movement to the tray including a flexible connector plate having a first end segment coupled to the tray, a bearing assembly, fastener means for attaching the bearing assembly to a second end segment of said flexible connector plate, a power output shaft driven by said power source and having an eccentric thereon imparting orbital motion to the bearing assembly and to said second segment of the connector plate, said eccentric having a rotational axis at all times vertically spaced from said second segment of the connector plate.

11. The drive assembly claimed in claim 10 wherein said drive assembly additionally includes stiffener plates, clamping means for attaching said stiffener plates to said connector plate for reducing the flexibility of the connector plate to alter the range of vibratory tray travel.

* * * * *